United States Patent
Files

[19]

[11] Patent Number: 5,857,433
[45] Date of Patent: Jan. 12, 1999

[54] ANIMAL TRAINING AND TRACKING DEVICE HAVING GLOBAL POSITIONING SATELLITE UNIT

[75] Inventor: John C. Files, 12011 NE 110th St., Vancouver, Wash. 98682

[73] Assignee: John C. Files, Vancouver, Wash.

[21] Appl. No.: 891,428

[22] Filed: Jul. 14, 1997

Related U.S. Application Data

[60] Provisional application No. 60/022,862 Jul. 22, 1996.

[51] Int. Cl.$^6$ .................................................. A01K 15/02
[52] U.S. Cl. .......................................... 119/720; 340/573
[58] Field of Search .................................... 119/720, 721, 119/859, DIG. 908; 340/573; 342/357; 367/139; 701/213

[56] References Cited

U.S. PATENT DOCUMENTS

| | | | |
|---|---|---|---|
| 4,335,682 | 6/1982 | Gonda et al. | 119/908 X |
| 4,794,402 | 12/1988 | Gonda et al. | 119/720 |
| 4,802,482 | 2/1989 | Gonda et al. | 119/720 |
| 4,918,432 | 4/1990 | Pauley et al. | 340/573 |
| 4,919,082 | 4/1990 | Tsai | 119/720 |
| 5,054,428 | 10/1991 | Farkus | 119/720 |
| 5,414,432 | 5/1995 | Penny, Jr. et al. | 342/357 |
| 5,471,954 | 12/1995 | Gonda et al. | 119/859 |
| 5,537,102 | 7/1996 | Pinnow | 340/825.3 |
| 5,572,216 | 11/1996 | Weinberg et al. | 342/357 |
| 5,605,116 | 2/1997 | Kim et al. | 119/720 |
| 5,666,908 | 9/1997 | So | 119/720 |
| 5,740,037 | 4/1998 | McCann et al. | 364/400 |

*Primary Examiner*—Thomas Price
*Assistant Examiner*—James S. Bergin
*Attorney, Agent, or Firm*—Klarquist Sparkman Campbell Leigh & Whinston, LLP

[57] ABSTRACT

A device for training/controlling and tracking an animal is described. The device includes both an aversive stimuli unit and a global positioning satellite system unit in a housing. Coupled to the housing is a harness, collar or other mechanism for attaching the device to an animal. The aversive stimuli unit is remotely operable using a hand-held control unit to aversively stimulate the animal wearing the housing. The global positioning satellite unit coupled to the housing allows determination of the animal's position relative to the operator of the hand-held control unit. A preferred embodiment of the present invention is designed particularly for tracking and training or controlling one or more dogs.

12 Claims, 3 Drawing Sheets

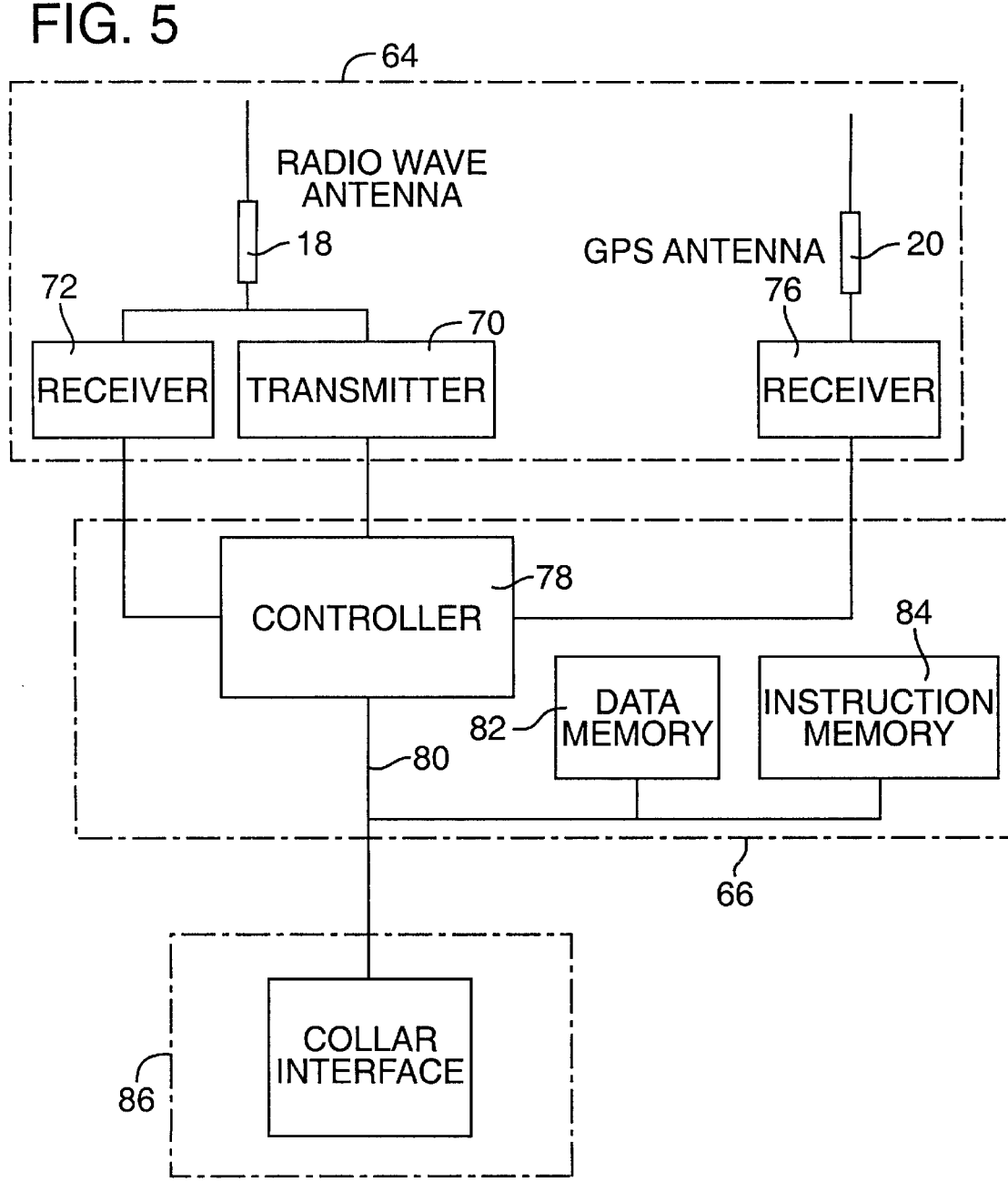

ANIMAL TRAINING AND TRACKING DEVICE HAVING GLOBAL POSITIONING SATELLITE UNIT

CROSS REFERENCE TO RELATED APPLICATION

This application claims priority from copending U.S. provisional patent application No. 60/022,862, filed on Jul. 22, 1996, which is incorporated herein by reference.

FIELD OF THE INVENTION

This invention concerns devices worn by animals, particularly collars worn by dogs, that include both remotely actuated aversive stimuli capability for training/controlling the animal and global positioning units for tracking the animal as it roams afield.

BACKGROUND OF THE INVENTION

Remote dog training devices that include hand-held remote-control radio transmitters and light-weight radio receivers are known. In fact, there are a number of publications that describe training animals using electric shock collars. For example, *Understanding Electronic Dog-Training*, by Dr. Daniel F. Tortora (1982), describes methods for using shock collars for training animals. Moreover, some of these inventions have been patented. For example, U.S. Pat. No. 4,335,682 describes a remotely controlled device that is worn by a dog. The device produces stimuli, such as an aversive electrical stimulus, that is followed by a sound or other second stimulus to condition the animal. This helps train the animal for its own safety, or perhaps to provide a relaxation response. Other stimuli also may be produced just prior to the onset of the aversive electrical stimulation. This becomes a conditioned warning stimulus to the animal.

U.S. Pat. No. 4,471,954 states that it is essential that training collars reliably and consistently apply an intended degree of stimulus to the animal. This is complicated by the fact that dogs have various coat and skin thicknesses. Also, certain environmental factors may change the conductivity of the animal's coat or skin, and hence the intensity of the signal perceived by the animal wearing the collar. One example of such an environmental factor is humidity or rain. If the animal's fur is wet, its ability to conduct electricity increases. As a result, stimulating the animal at an early stage in a field training exercise may be less intensely received by the animal compared to the intensity of the stimulus received after the dog's coat is moistened.

Another animal training apparatus is described in U.S. Pat. No. 4,802,482. This patent also concerns solving the problem of providing optimum stimulus levels to the dog for particular training conditions. If the stimulus is too intense, it may have negative effects on the animal. On the other hand, the stimulus must be sufficiently intense to achieve the desired training or control desired.

While a number of inventions are known for remotely stimulating dogs and other animals for training purposes, it still is difficult to track such animals if they are off-leash and moving far afield. In fact, dogs often are lost during training exercises or competitions as they wander too far from the owner or trainer. In this situation, not only may a prize animal be lost but so would the expensive training collar being worn by the animal.

SUMMARY OF THE INVENTION

One method for accurately determining the position of an object is to utilize the signals received from the U.S. Department of Defense Global Positioning System (referred to herein as GPS). The devices of the present invention combine the training capabilities of devices that provide remotely actuated aversive stimuli, such as electronic shock collars, with global positioning units. This provides a device worn by animals for both training and tracking the animal. A hand-held unit for remotely actuating the aversive stimuli and to track the animal's position as it wanders afield also is described.

One embodiment of the present device houses both an aversive stimuli unit and GPS unit in a single housing that is worn by an animal. Thus, coupled to the housing is a harness, collar or other mechanism for securing the device to an animal. The aversive stimuli unit is remotely operable using a hand-held control unit to aversively stimulate the animal wearing the housing. The hand-held control unit therefore includes a transmitter for actuating the stimuli unit. The GPS unit coupled to the housing allows an operator to determine the animal's location relative to the location of the hand-held control unit.

Moreover, the housing also may include a receiver antennae for receiving signals transmitted to the housing from a transmitter antennae coupled to the hand-held unit. This allows the operator of the hand-held control unit to administer an aversive stimuli to the animal remotely. An intensity switch likely will be coupled to the hand-held unit for selecting the intensity of the aversive stimuli applied to the animal. The hand-held unit also may include a display device for displaying information about the operation of the device and location of the animal.

An alternative embodiment of the present invention uses only the tracking capability of the GPS unit. A harness, collar or other device is used to secure a housing to an animal. A global positioning satellite system unit is coupled to the housing for determining the position of the animal wearing the device.

A preferred embodiment of the present invention is designed particularly for tracking and training or controlling a dog. The device comprises, amongst other features, a collar having a housing attached thereto, and electrodes coupled to the housing that are remotely operable using a hand-held control unit. A GPS unit is coupled to the housing for determining the dog's position as it roams afield. Like the device described above, the dog training/controlling and tracking device may include intensity switches, keypad entry, display units, etc., for providing a more commercially desirable apparatus.

BRIEF DESCRIPTION OF THE DRAWINGS

FIG. 5 is a block circuit diagram illustrating transmit and receive circuitry coupled to a control circuit.

DETAILED DESCRIPTION OF THE PREFERRED EMBODIMENTS

Figure 1:
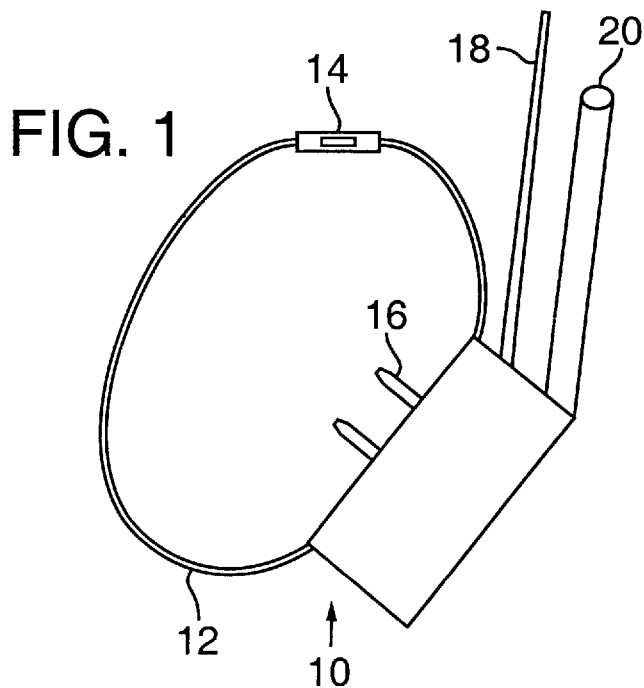
FIG. 1 is a schematic drawing illustrating a collar having both an aversive stimuli unit and a global positioning antennae.

The present invention combines remotely actuated training devices with global positioning systems that allow animals wearing the device to be controlled or trained as well as tracked. The training or control portion of the device and the global positioning unit are basically separate units that are integrated in a single housing that can be worn, or otherwise attached, to an animal. For example, training collars often are worn by animals, and such collars can be adapted to house both the training unit as well as the global positioning unit. However, the device is not limited to being housed in a collar, and the housing can be adapted to be worn by animals about their torso, neck, appendages, or any other means by which the housing can be attached to the animal. Collars generally are easiest to use and most familiar; hence, the following discussion is particularly directed to embodiments of the invention that are adapted for use with animal collars.

The following paragraphs describe embodiments of the remotely actuated training collar, the global positioning system, and a hand-held control unit for remotely actuating an aversive signal, such as an electronic shock, that is administered to the animal wearing the collar.

I. Apparatus

Examples of electronic, remotely controlled animal collars are described in several U.S. patents, including U.S. Pat. No. 4,335,682, entitled "Animal Training Apparatus"; U.S. Pat. No. 4,802,482, entitled "Method and Apparatus for Remote Control of Animal Training Stimulus"; U.S. Pat. No. 4,794,402, entitled "Antenna for Animal Training Receiver Unit Mounted Beneath Collar"; and U.S. Pat. No. 5,471,954, entitled "Animal Training Electrode Structure Including Integral Resistive Element." Each of these patents is incorporated herein by reference. The present invention can make use of any such electronic training collars.

Global positioning units also are known. GPS is a satellite-based navigation and position determination system. This system includes twenty-four satellites orbiting the earth with each satellite transmitting electric wave signals. Such signals include a data stream with positional data indicating a satellite's current position and time data indicating the time that the satellite transmitted the data stream.

A mobile GPS receiver (usually located on earth) receives the electric wave signals from at least three satellites. The receiver's current latitude and longitude or other two-dimensional information, such as the receiver's travel direction, are calculated based on the positional data of a satellite and on a time difference between transmission of the data stream from a satellite and receipt of the data stream by the receiver. The receiver also may receive signals from four satellites to obtain an accurate three-dimensional position which includes altitude.

Current civilian GPS receivers have a typical accuracy of 100 meters. However, accuracy to 5 meters is possible using differential GPS. Differential GPS uses a fixed receiver station to receive GPS signals. The fixed receiver station calculates an ionosphere correction into the received signals and retransmits the corrected information to mobile GPS receivers.

While the accuracy of the GPS unit is 100 meters without the use of differential GPS, the fact that both the hand-held and animal device units receive the same signal errors, and are calculating distance and movement of each, allows determination of animal movement within the five meter accuracy. The exact position of the device is not as critical as is the ability to determine (1) the general direction and distance of the animal relative to the hand-held unit, (2) whether the animal becomes stationary for a period of time, or (3) whether the animal is about to exceed a desired distance from the hand-held unit. The unit also can store stationary waypoints, such as a vehicle location, similar to currently available GPS units. The 100-meter accuracy is acceptable for this application.

GPS units are commercially available. Such units can be used to practice the present invention by coupling such units with the aversive signal circuitry and hand-held control-unit circuitry. Examples of suitable commercially available GPS units include: (1) Magellan's GPS SENSOR™, Model Nos. 10100, Meridan™, Meridan XL™, and NAV 5000DLX™, which are available from Magellan, 960 Overland Ct, San Dimas Calif. 91773; (2) Garmin's GPS 65 Personal Navigator, which is available from Garmin International, 9875 Widmer Road, Lenexa, Kans. 66215; and (3) AccuNav Sport GPS, which is available from Eagle Electronics, P.O. Box 669, Catoosa, Okla. 74015.

FIG. 1 is a schematic drawing illustrating a device 10 that includes means for securing the device to an animal. The illustrated device uses a collar 12 that can be sized to fit about the neck of the animal. However, as stated above, collar 12 also might be a harness, or other unit for actually physically securing the device 10 to an animal, such as a tag. The illustrated collar 10 also includes a latch 14 for securing the collar 12 about the animal's neck.

The device 10 also includes some mechanism for applying an aversive stimuli to an animal wearing the device. Examples of such aversive stimuli include sound, either loud, audible sounds, or sounds inaudible to humans but pitched so that animals can hear the stimuli. However, the most likely aversive stimuli to be used is a mild electronic shock. A collar designed to administer aversive electronic shocks is illustrated in FIG. 1. The device 10 illustrated in FIG. 1 includes shock prongs 16 for applying the electric shock to the animal.

Figure 2:
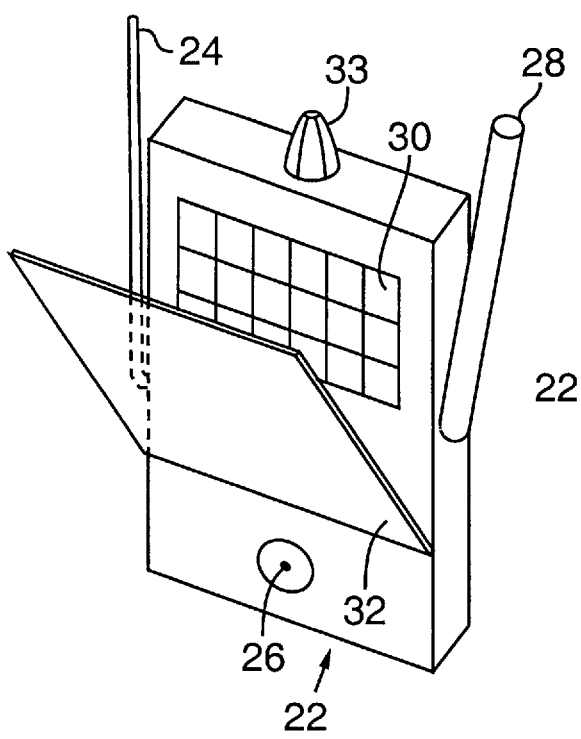
FIG. 2 is a schematic drawing of a hand-held control unit for controlling the collar of FIG. 1, and for monitoring the animal's location using the global positioning unit.

The device 10 illustrated in FIG. 1 also includes both a receiver antenna 18 and a GPS antenna 20. Antenna 18 receives signals transmitted to the device 10 by the hand-held unit 22 illustrated in FIG. 2. The hand-held unit 22 includes a transmitter antenna 24 for transmitting signals from the hand-held unit 22 to the device 10 via the receiver antennae 18. To transmit an aversive stimuli signal, such as an electric shock, from the hand-held unit 22 via antennae 24 to the receiver antennae 18 on the animal unit 10, an operator may depress the recessed stimuli actuator 26. The hand-held unit 22 also includes a GPS antennae 28.

The hand-held unit 22 also may include features that are not necessary to the basic function, but which make the device more useful and commercially desirable. For example, the hand-held unit 22 also may include a keypad entry 30 for keying in information concerning the operation and operational settings for device 22 and one or more device(s) 10. This could include the animal unit serial number and shock code, shock intensity (if other than the default setting is desired), etc., for each individual animal device 10. The hand-held unit 22 may include a cover 32 for covering and protecting the keypad entry 30 from damage and perhaps to guard against inadvertent entries that might be made by an operator. In one embodiment, cover 32 pivots up to 180 degrees for ease of screen monitoring while entering data through the keypad. The flip cover 32 also provides hands-free viewing of the display, such as a polar plot if fitted in a shoulder harness and positioned on the operator's chest in a position that does not interfere with the operator's gun shoulder.

Moreover, the hand-held unit 22 may include an intensity selection switch 33. Switch 33 is useful for quickly increasing or decreasing the intensity of the signal that is transmitted via the transmitter antennae 24 to the receiver antennae 18. Hand-held unit 22 also may include an LCD display region (not illustrated). The display region generally is protected by cover 32. The display region displays operation information and animal location using digital data and polar-plot graphical outputs.

Figure 3:
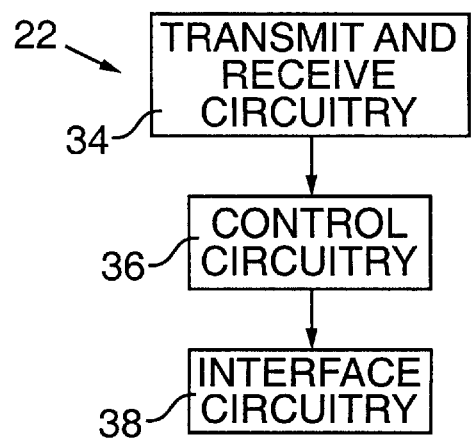
FIG. 3 is a block circuit diagram illustrating electronic circuitry used in a control unit.
Figure 4:
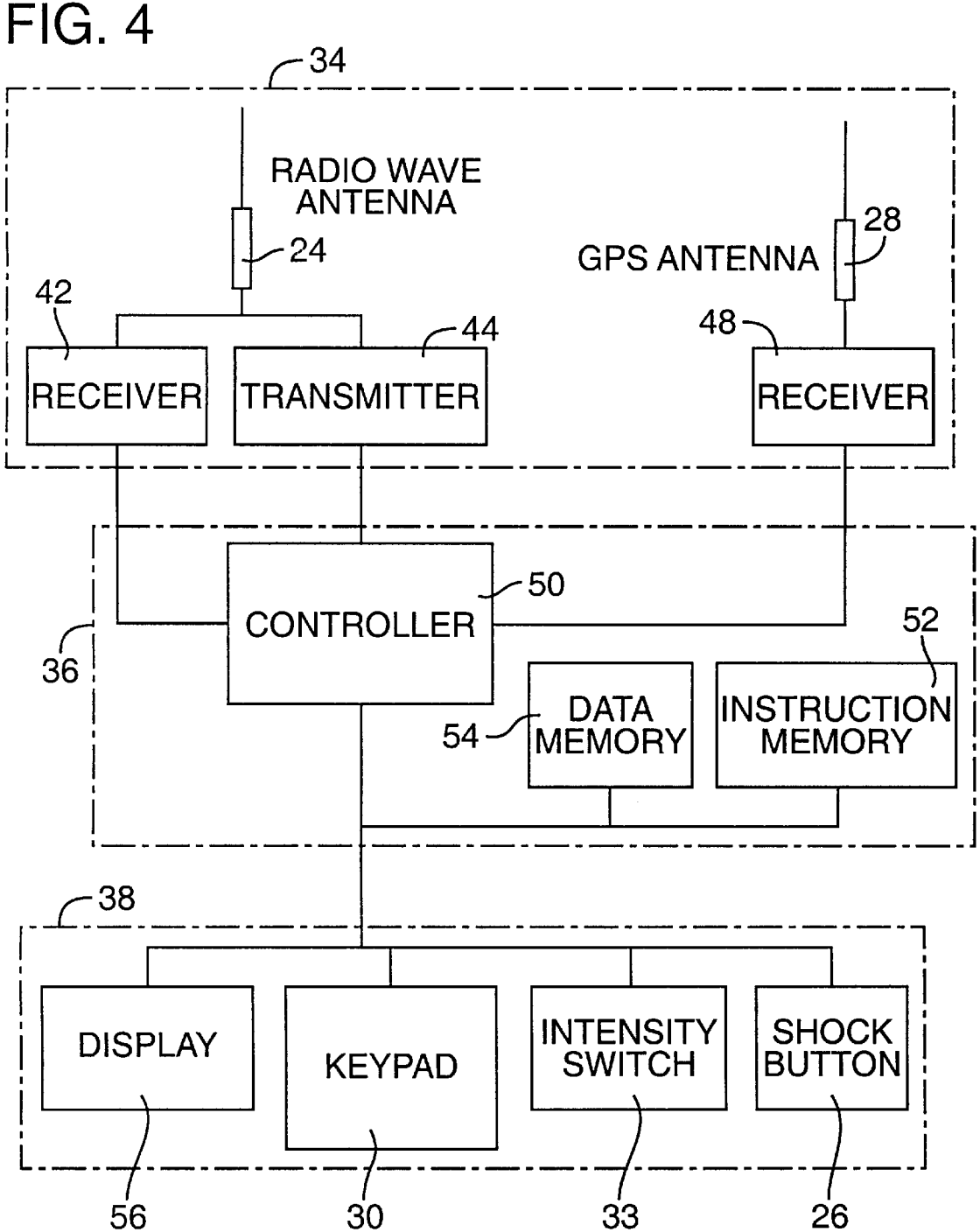
FIG. 4 is a block diagram illustrating the electronic circuitry of the hand-held control unit.

FIGS. 3–5 provide additional information concerning the electronic features briefly discussed above. FIG. 3 is a schematic diagram which illustrates the circuitry used for the hand-held control unit 22. The control unit 22 controls the device 10 through radio-wave transmissions. The control unit 22 contains transmit and receive circuitry 34 allowing for two-way radio communication (half- or full-duplex) between the control unit 22 and device 10. The transmit and receive circuitry 34 also is adapted to receive electric wave signals transmitted by GPS satellites. When receiving, the circuitry 34 receives a modulated signal having a carrier portion and a data portion. The data portion contains information necessary to calculate the position of the control unit 22 or device 10. The circuitry 34 separates the data and carrier portions and converts the data portion to proper digital signal voltage levels for processing by the control unit 22. When transmitting, the circuitry 34 converts a digital signal to a modulated signal having appropriate voltage levels for transmission as is further described below.

Control circuitry 36 is coupled to the transmit and receive circuitry 34. In receiving mode, control circuitry 36 receives the data portion from transmit and receive circuitry 34 and calculates the coordinates of either the control unit 22 or the device 10 therefrom. In transmit mode, the control circuitry 36 determines a message to send to the transmitting circuitry 34 and formats the data for proper transmission. Interface circuitry 38 receives command signals from an operator and generates display signals for communication to an operator.

FIG. 4 shows a more detailed circuit diagram of the control unit 22. The signal transmit and receive circuitry 34 includes radio wave antenna 24 for transmitting radio waves to the device 10 and for receiving radio waves from the device 10. A receiver 42 is coupled to the radio wave antenna 24 and receives a modulated signal therefrom. The receiver 42 includes a demodulator (not shown) which separates the modulated signal into a carrier portion and a data portion. Additionally, the receiver 42 converts the signal to proper digital voltage levels for transmission to the control circuitry 36.

Transmit and receive circuitry 34 further includes transmitter 44 which receives signals to be transmitted from the control circuitry 36. The transmitter 44 converts signals received from the control circuitry 36 from digital voltage levels to levels sufficient for radio-wave transmission. The transmitter 44 includes an encoder (not shown) which converts the digital signal to a modulated signal having a data portion and a carrier portion. Transmission between the transmit and receive circuitry 34 and the control circuitry 36 is accomplished through a serial transmission interface, such as an RS-232 serial interface. A parallel interface between the transmit and receive circuitry 34 and the control circuitry 36 is also possible. It will be recognized that the radio-wave receiver 42 and transmitter 44 can be incorporated into a single integrated circuit.

Transmit and receive circuitry 34 further includes a GPS antenna 28 configured to receive electric wave signals generated from GPS satellites. The GPS antenna 28 is coupled to a GPS receiver 48 which demodulates the signal, converts the signal to digital voltage levels and delivers a data portion of the signal in serial format to the control circuitry 36. Such transmission to the control circuitry 36 may be accomplished through an RS-232 interface.

The control circuitry 36 is coupled to the transmit and receive circuitry 34 to receive signals from the radio wave antenna 24 through receiver 42 and from the GPS antenna 28 through GPS receiver 48. The control circuitry 36 includes a controller 50 which can be a microprocessor or a microcontroller. The control circuitry 36 further includes an instruction memory 52, such as a ROM, and a data memory 54, such as a RAM, both coupled to the microcontroller. Depending on the type of controller used, the instruction and data memories may be included within the controller, rather than as separate integrated circuits.

The interface circuitry 38 is coupled to the control circuitry 36 and includes a display 56, such as a liquid crystal display (LCD), coupled to the controller 50 for displaying messages to the user. The display 56 can be used to provide the user with a hierarchical menu system so that the operator can control functions provided by the control unit 22.

A keypad 30 is coupled to the controller 50 and allows a user to input data to the control unit 22. The keypad 30 can be used in conjunction with the display 56 to allow a user to move through a hierarchical menu system.

The stimuli actuator, or shock button, 26 is coupled to the controller 50 and is used as an input to direct the controller 50 to send a shock message over the radio wave antenna 24. The shock button 26 is optional since its function may be incorporated into the keypad 30 and display menu system. However, for convenience and for quick control over an animal wearing the device 10, the shock button 26 allows a user to control the device 10 with a single depression of a button.

Intensity switch 33 is coupled to the controller 50 for adjusting the intensity of the shock stimuli applied to the animal wearing the device 10. The intensity switch 33 includes a rheostat (not shown) coupled to a turnable control knob and an analog-to-digital converter (ADC) (not shown). Turning the control knob results in a change in voltage level delivered to the ADC. The ADC provides a corresponding digital output to the controller 50. Like the shock button 26 the intensity switch 33 may be included in the menu system operated through the keypad 30 and display interface.

It will be recognized that many of the separate components shown in FIG. 4 may be incorporated into a single integrated circuit if desired. Additionally, many of the functions may be implemented in software in whole or in part.

FIG. 5 shows that the device 10 has transmit and receive circuitry 64 coupled to control circuit 66. The transmit and receive circuitry 64 is similar to the transmit and receive circuit 34 illustrated in FIG. 4. Thus, the circuitry 64 includes a radio-wave antenna 18 coupled to a transmitter 70 and a receiver 72. The circuitry 64 also includes a GPS antenna 20 and receiver 76. Control circuit 66 includes a controller 78 coupled by a bus 80 to data memory 82 and instruction memory 84. The control circuit 66 is similar to that described in FIG. 4.

An interface circuit 86 is coupled to the control circuit 66 and is adapted to convert a control signal provided on bus 80 to the appropriate voltage levels and format needed to interface with device 10. Shock collars, such as that illustrated with device 10, have their own receiver circuits for decoding transmitted signals, such as the shock collar disclosed in Gonda's U.S. Pat. No. 4,802,482, which is incorporated herein by reference. In such a case, the interface circuitry 86 must bypass the receiver circuit of the shock collar and connect directly to the collar components which activate the shock.

II. Operation

In operation, the device 10 unit receives GPS position data through GPS antenna 20 within transmit and receive circuitry 64. The data is delivered to control circuitry 66. The controller 78 interprets the data to calculate its current coordinates (longitude, latitude and optionally altitude). The coordinates of device 10 are transmitted by the control circuitry 66 to the transmitter 70. The transmitter circuit encodes the data in the form of a modulated signal and transmits the data via radio waves to the control unit 22. The control unit 22 also receives GPS position data so that it may calculate its own coordinates. Upon receiving the coordinates of device 10, the control unit 22 determines the relative position between the control unit 22 and device 10. The relative positions between the control unit 22 and device 10 are displayed on display 56.

If a user wishes to send a command to an animal, the user may select a desired intensity using intensity switch 33 and depress shock button 26. The control circuitry 36 interprets the signal from shock button 26 and delivers an appropriate data stream to the transmitter 44. The transmitter 44 modulates the data stream and transmits the signal via antenna 24 to the device 10. Device 10 receives the signal in the transmit and receive circuitry 64 and delivers the data stream to the control circuitry 66. The control circuitry 66 interprets the command data and delivers the signal in proper format via bus 80 to the interface circuitry 86 to shock the animal.

One embodiment of the hand-held unit 22 includes a plotter display feature. This allows an operator to observe the relative movement of the hand-held unit 22 and the relative movement of one or more selected devices 10 worn by the animals that are within the receiving range of the hand-held unit 22. The hand-held unit 22 is software configurable through keypad entry and can store serial numbers corresponding to particular devices 10, as well as shock access codes. Animal devices 10 can be selected for tracking in the field by pressing an appropriate key or keys on the hand-held unit 22. Other similar hand-held units 22 also could monitor any similar animal device 10 by entering the appropriate serial number and using the appropriate keys. The microprocessor of hand-held unit 22 calculates the movement of the device 10 and provides an alarm at the hand-held unit 22 when a selected animal device 10 does not move more than the accuracy of the GPS unit within a specified time period. This is desirable for alerting the operator that a tracked animal has become stationary.

The display portion of the hand-held unit 22 uses a dotted line to display the path that the hand-held unit 22 has taken. A dotted line also is displayed for the path each device 10 selected by the operator for tracking has taken. A number or other symbol appears on the display to indicate the location of each animal device 10. In one embodiment, the stationary alarm causes the number or other symbol to blink on the plotter display as long as the device 10 remains stationary.

Another important feature of the hand-held unit 22 would be to provide an alarm if one of the animal devices 10 exceeds a set distance from the hand-held unit 22. This would alert the operator that the animal is moving beyond a desired range or may be about to move out of transmitter-receiver range. This allows the operator to close this distance, and thereby still track and control the animal.

The unit 10 generally includes electrodes 16 for delivering a mild shock to the animal wearing the device 10. The hand-held unit 22 is software configurable to select the animal device 10 that will receive the instructions to provide the electric shock when an appropriate button is depressed on the hand-held unit 22. This could be done, for example, by pressing the "CONTROL" key and the "2" key to administer the aversive stimuli to the animal wearing the unit 10 having a serial number that was stored as "2". If the shock access code for the unit's serial number is not stored in the hand-held unit 22, then it would not be possible to send a shock to that unit. For this reason, the shock access code for each animal device 10 should be kept confidential. The devices 10 also may have individual power activation capability for the GPS and shock features. In this embodiment, if the shock feature is not turned "ON," then no hand-held unit 22 can transmit instructions to shock the animal wearing device 10.

The present invention has been described with reference to preferred embodiments. It will be apparent to those persons of ordinary skill in the art that the invention may be varied from that described herein, and still be within the scope of the invention.

I claim:

1. A device to be worn by an animal for tracking and training or controlling the animal, comprising:
    an aversive stimuli unit, the stimuli unit being remotely operable usa hand-held control unit to aversively stimulate the animal wearing the device, said stimuli unit connected to a support; and
    a global positioning satellite system unit connected to said support for determining the position of the animal wearing the device.

2. The device according to claim 1 wherein the hand-held control unit includes a transmitter for actuating the stimuli unit.

3. The device according to claim 1 wherein the stimuli unit comprises electrodes for delivering a mild shock to the animal wearing the device.

4. The device according to claim 3 and further including an intensity switch coupled to the hand-held unit for selecting the intensity of the electric shock that is applied to the animal.

5. The device according to claim 1 including a receiver antennae for receiving signals transmitted to the device from a transmitter antennae or satellite communication operably coupled to the hand-held unit.

6. The device according to claim 1 wherein the hand-held unit includes a display device for displaying information about the operation of the device and location of the animal.

7. The device according to claim 1 and further including an intensity switch coupled to the hand-held unit for selecting the intensity of the aversive stimuli applied to the animal.

8. A device for tracking and training or controlling a dog, comprising:
    a collar having a housing attached thereto;
    electrodes coupled to the housing, the electrodes being remotely operable using a hand-held control unit; and a global positioning satellite unit coupled to the housing for determining the dog's position as it roams afield.

9. The device according to claim 8 wherein the hand-held control unit includes a transmitter for actuating the stimuli unit.

10. The device according to claim 8 wherein the housing includes a receiver antennae for receiving signals transmitted to the housing from a transmitter antennae coupled to the hand-held unit.

11. The device according to claim 8 wherein the hand-held unit includes a display device for displaying information about the operation of the device and location of the animal.

12. The device according to claim 8 and further including an intensity switch coupled to the hand-held unit for selecting the intensity of the electric shock applied to the animal.

* * * * *

UNITED STATES PATENT AND TRADEMARK OFFICE
CERTIFICATE OF CORRECTION

PATENT NO. : 5,857,433

DATED : Jan. 12, 1999

INVENTOR(S) : Files

It is certified that error appears in the above-identified patent and that said Letters Patent is hereby corrected as shown below:

Claim 1, Column 8, line 33, replace "usa" with --using a--.

Signed and Sealed this

Sixteenth Day of January, 2001

Attest:

Q. TODD DICKINSON

Attesting Officer

Commissioner of Patents and Trademarks